(12) United States Patent
Demetriades et al.

(10) Patent No.: US 8,810,985 B2
(45) Date of Patent: Aug. 19, 2014

(54) HYBRID CIRCUIT BREAKER

(71) Applicants: Georgios Demetriades, Vasteras (SE); Anshuman Shukla, Vasteras (SE)

(72) Inventors: Georgios Demetriades, Vasteras (SE); Anshuman Shukla, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/627,549

(22) Filed: Sep. 26, 2012

(65) Prior Publication Data

US 2013/0021708 A1 Jan. 24, 2013

Related U.S. Application Data

(63) Continuation of application No. PCT/EP2010/054003, filed on Mar. 26, 2010.

(51) Int. Cl.
*H02H 9/02* (2006.01)
(52) U.S. Cl.
USPC .............................. 361/102; 361/13
(58) Field of Classification Search
USPC ................................... 361/13, 102
See application file for complete search history.

(56) References Cited

U.S. PATENT DOCUMENTS

| | | |
|---|---|---|
| 5,510,946 A | 4/1996 | Franklin |
| 5,689,397 A | 11/1997 | Pohl et al. |
| 6,028,471 A | 2/2000 | Koyama et al. |
| 6,226,163 B1 * | 5/2001 | Bernhoff et al. ............. 361/93.1 |
| 6,760,202 B1 | 7/2004 | Meyer et al. |

FOREIGN PATENT DOCUMENTS

DE 19601540 A1 11/1996

OTHER PUBLICATIONS

International Preliminary Report on Patentability; Application No. PCT/EP2010/054003; Issued: Apr. 10, 2012; 12 pages.
International Search Report & Written Opinion of the International Searching Authority; Application No. PCT/EP2010/054003; Issued: Oct. 26, 2010; Mailing Date: Nov. 4, 2010; 9 pages.

* cited by examiner

*Primary Examiner* — Rexford Barnie
*Assistant Examiner* — Tien Mai
(74) *Attorney, Agent, or Firm* — St. Onge Steward Johnston & Reens LLC

(57) ABSTRACT

A hybrid circuit breaker for interrupting a fault current in an electrical circuit line having a line impedance, the hybrid circuit breaker including a mechanical circuit breaker adapted to interrupt the line upon detecting the fault current, a semiconductor device arranged in parallel with the mechanical circuit breaker to conduct the fault current when the mechanical circuit breaker is disconnected, a branch connected between the electrical circuit line and ground, the branch including an impedance unit and a control unit configured, upon detecting the fault current, to connect the impedance unit in parallel with the line impedance.

9 Claims, 4 Drawing Sheets

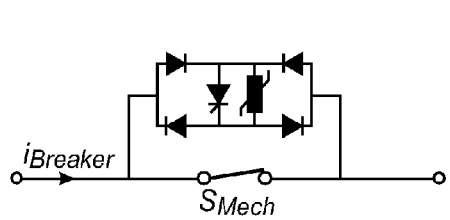
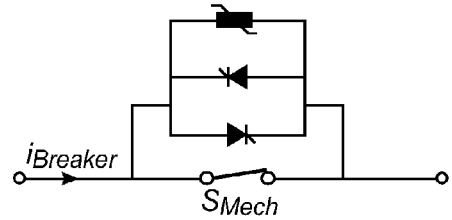
*Fig. 1a (prior art)*      *Fig. 1b (prior art)*
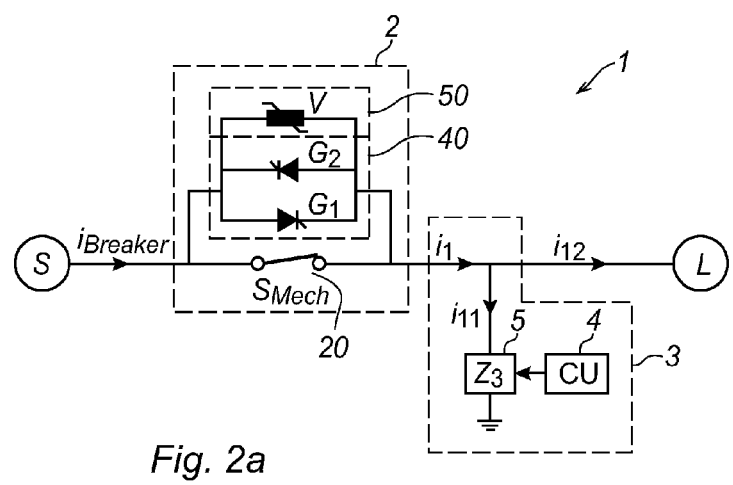
*Fig. 2a*
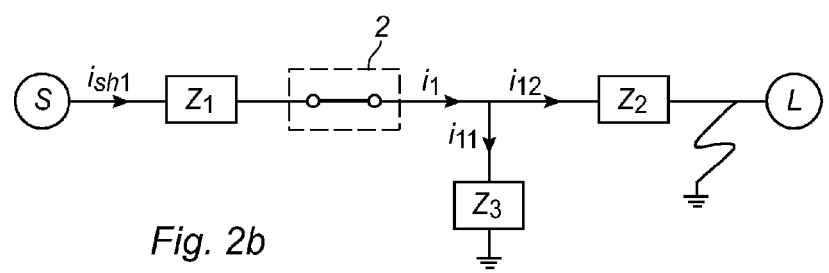
*Fig. 2b*

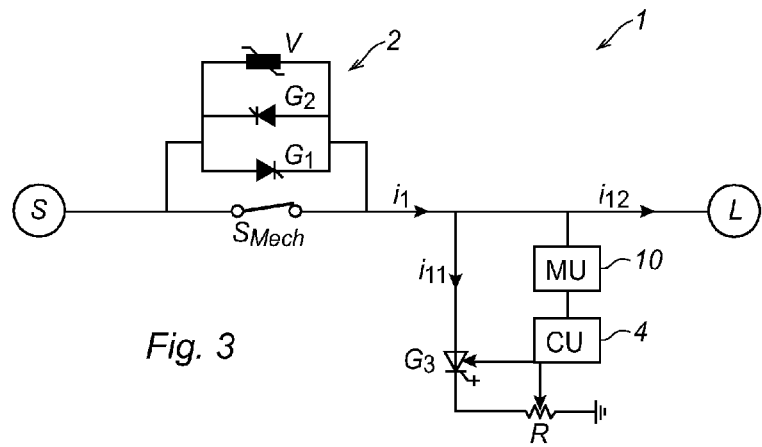
Fig. 3
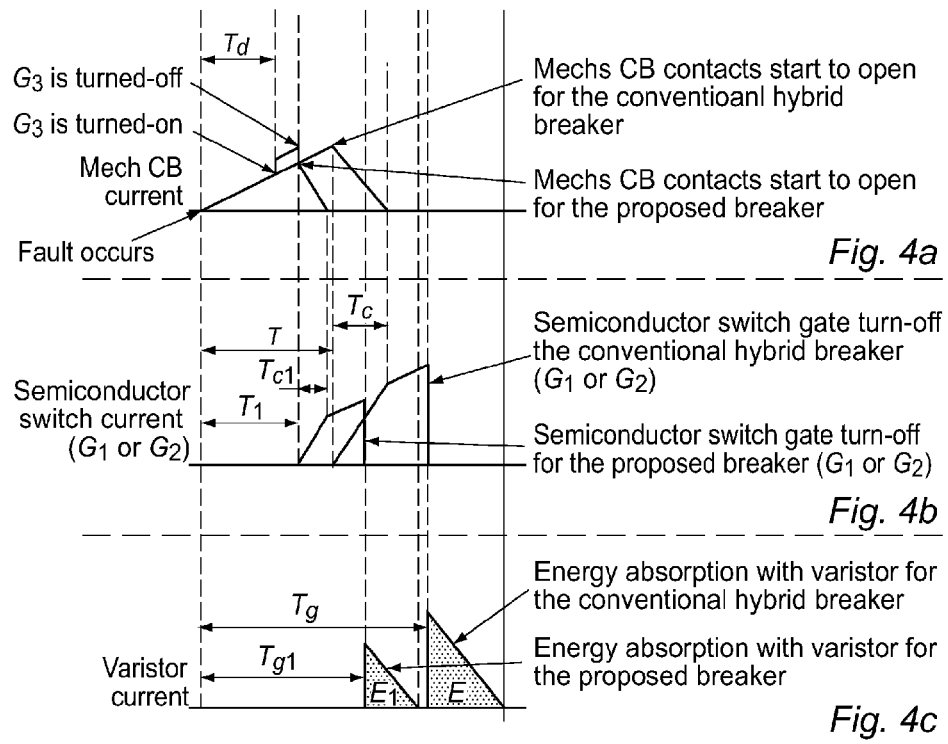
Fig. 4a
Fig. 4b
Fig. 4c

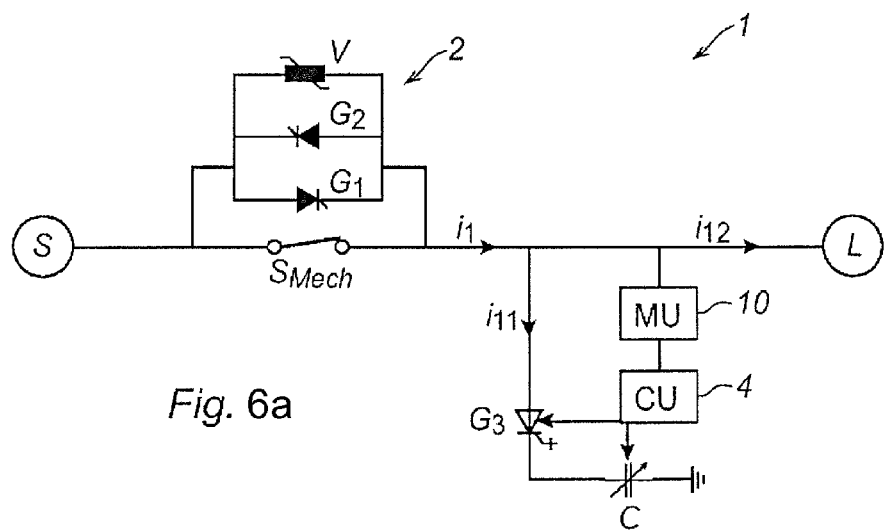
*Fig.* 6a
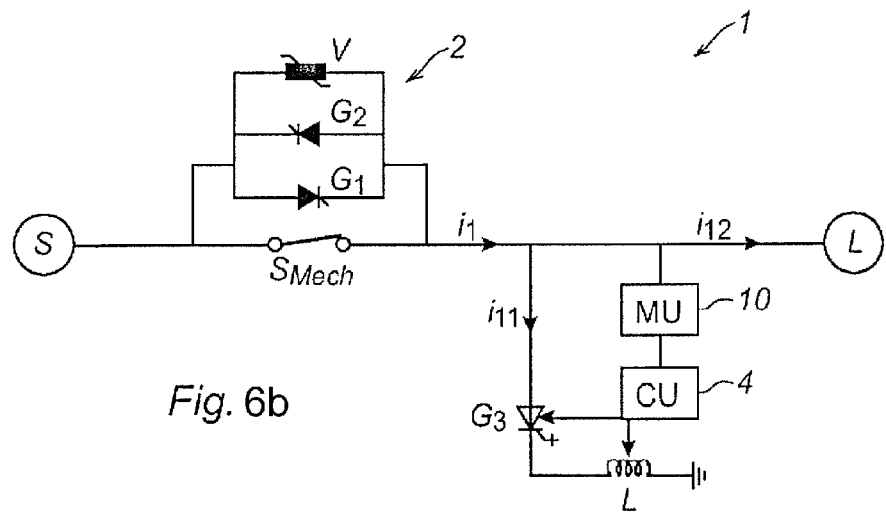
*Fig.* 6b

HYBRID CIRCUIT BREAKER

FIELD OF THE INVENTION

The present invention relates to a hybrid circuit breaker for interrupting fault currents to protect an electrical circuit line from damage caused by faults, for example overload or short circuit. Such an electrical circuit line may be a power transmission or distribution line, or an electrical power line in an AC/DC application, with at least one power source arranged at one end of the circuit line.

BACKGROUND OF THE INVENTION

Recent progress in power electronics makes it possible to combine a conventional mechanical circuit breaker with a semiconductor switch device into a so-called hybrid circuit breaker for interrupting a fault current in an electrical circuit line. Such a hybrid circuit breaker comprises a mechanical circuit breaker for interrupting the line upon detecting the fault current and comprising a movable contact and a stationary contact and a semiconductor device, a solid-state part, arranged in parallel with the mechanical circuit breaker to conduct the fault current when the mechanical circuit breaker is disconnected. Depending on device ratings, the semiconductor device may include a set of serial or parallel connected controllable semiconductor units, for example thyristors, GTOs (Gate Turn-Off thyristor), IGBTs (insulated gate bipolar transistor) or IGCTs (Integrated Gate Commutated Thyristor).

Under normal working conditions, the semiconductor units of the solid-state part are turned-off and the contacts of the mechanical breaker are in a closed position and current is conducted through the mechanical circuit breaker that has low on-state losses. When activated, for interrupting the current, the semiconductor units have to be fired first in order to provide a parallel branch for a current commutation process. The mechanical circuit breaker is disconnected by opening the contacts, leading to an arc voltage which is responsible for the commutation of the current to the parallel branch. Since the air gap between the contacts is not able to block the full voltage, the semiconductors must conduct the current for a certain amount of time. Once the contacts of the mechanical circuit breaker are locked sufficiently and completely disconnected, this holding-off interval, also called conduction time, is elapsed and the semiconductor units are turned off. Following turn-off of the semiconductor units, the stored energy in the loop inductance may be absorbed by the overvoltage protection element, such as a varistor.

Examples of such hybrid circuit breakers are shown in FIG. 1a and FIG. 1b. A U.S. Pat. No. 6,760,202 B1 discloses a hybrid circuit breaker comprising a mechanical breaker and a solid-state circuit breaker connected in parallel with the mechanical breaker. The solid-state part of the hybrid circuit breaker includes a diode bridge for making the breaker work for both directions of a current, at least one thyristor of the type IGCT for contacting a fault current when the mechanical breaker is open and a MOV (Metal Oxide Varistor) connected in parallel with the IGCT and for limiting voltages across the devices when the IGCT is opening and for dissipating the inductive energy of the main circuit line.

It takes a mechanical delay for the mechanical breaker to start to open upon detecting a fault current, which consequently influences a total reaction time for fault clearance. To achieve high quality of safety and reliability, it is desired that a hybrid circuit breaker reacts to a current fault as fast as possible and, meanwhile keeps the conduction time of the solid-state devices as low as possible so that no overheating is generated to lead failures of the devices.

SUMMARY OF THE INVENTION

The first object of the present invention is to provide an improved hybrid circuit breaker for reducing reaction time of the breaker and providing a faster commutation time.

This object is achieved by a hybrid circuit breaker.

Such a hybrid circuit breaker comprises a mechanical circuit breaker adapted to interrupt the line upon detecting the fault current, and a semiconductor device arranged in parallel with the mechanical circuit breaker to conduct the fault current when the mechanical circuit breaker is disconnected, characterized in that the hybrid circuit breaker further comprises a branch connected between the electrical circuit line and ground, the branch including an impedance unit and a control unit configured, upon detecting the fault current, to connect the impedance unit in parallel with the line impedance.

The hybrid circuit breaker is connected in series with an electrical circuit line that has a line impedance. In a normal working condition, the mechanical breaker is in a closed position therethrough the current flows and the impedance unit is disconnected from the circuit line. When a fault current, for example a short circuit, is detected, an impedance is momentarily imposed into the line impedance by connecting the impedance unit into the circuit line. Because the branch is connected in shunt to the power line at one terminal and grounded at another terminal, a circuit line is formed in parallel with the short circuit. The total line impedance is therefore reduced due to this parallel impedance, which, consequently, momentarily increases the magnitude of the fault current flowing in the line and makes the mechanical breaker react faster. This is because, with increased magnitude of the fault current, the mechanical breaker can reach a stable position much earlier, where the movable contact of the breaker can be sufficiently locked and it also makes it possible that the fault current can be commutated to the semiconductor device earlier.

The impedance unit can be, for example a resistance, an inductance or a capacitance, or a combination thereof.

It is yet another object of the present invention to provide an improved hybrid circuit breaker for interrupting a fault current within a fixed time period regardless of the fault location.

According to a preferred embodiment of the invention, a variable impedance unit is arranged in the branch and the control unit is further configured, upon detecting a fault current, to adjust the impedance value of the variable impedance unit in order to increase the magnitude of the fault current. In general, the lower the impedance between a power source and the fault location, the shorter time it takes for the mechanical circuit breaker to start to open. This means that, for a fault that occurs at a longer distance to the power source, the mechanical breaker has a longer reaction time compared with a fault closer to the power source since the latter has a smaller impedance. By adjusting the impedance value of the variable impedance unit, it is possible to enable a desired amount of the magnitude of the fault current to be increased to a pre-set value within a fixed time, which results in the mechanical breaker being disconnected within a fixed time irrespective of the fault location. This also means that it is possible for the hybrid circuit breaker to conduct a complete opening sequence within a fixed time period to achieve more reliability and safety.

This object is achieved by arranging a measuring unit to measure an electrical quantity of the electrical circuit line and, upon detecting the fault current, predicting the peak magnitude of the fault current based on the measured electrical quantity of the electrical circuit line and determining the impedance value of the variable impedance unit based on the predicted peak magnitude of the fault current. Such a measured electrical quantity can be any of current or impedance.

According to another embodiment of the invention, the control unit is further configured to disconnect the variable impedance unit from the line impedance when the pre-set value of the peak magnitude of the fault current is reached. Once the peak magnitude of the fault current reaches the pre-set value, which means that the movable contact of the mechanical breaker can be locked sufficiently, the variable impedance is disconnected from the line impedance so that the magnitude of the fault current drops down to the natural level. This makes it possible that a lower current to be interrupted is flowing through the semiconductor device. Therefore, failure of overheating of the semiconductor device can be avoided. This consequently enables a reduced rate of the semiconductor device.

According to yet another preferred embodiment of the invention, a switch is arranged in the branch and configured, upon receiving a control signal from the control unit, to connect or disconnect the variable impedance unit to or from the line. Such a switch can be a semiconductor unit with turn-off capability.

It is advantageous that a semiconductor switch is used to connect or disconnect the variable impedance since it enables the connection or disconnection of the impedance unit with a fast speed. When the contacts of the mechanical breaker can be safely locked, the impedance unit is disconnected from the circuit line by turning off the switch so that the circuit line has a natural fault current which is of lower value than the one with the impedance unit connected in the circuit line. It is yet another advantage that such a semiconductor switch has the turn-off capability, because, in a post-fault scenario, when the fault has been cleared out, the impedance unit should be disconnected from the circuit line, which is done by turning off the semiconductor switch.

It should be understood that the invented hybrid breaker can be used in DC or AC current interruptions.

The objects of the invention are also achieved by a method for interrupting a fault current. Such a method comprises the steps of detecting a fault current, generating and signaling out a fault signal, receiving the fault signal and generating a turn-on signal for the semiconductor device and an open signal for the mechanical circuit breaker, measuring an electrical quantity of the electrical circuit line when a fault current is detected, predicting the peak magnitude of the fault current based on the measured electrical quantity, determining the impedance value of the variable impedance unit based on the predicted peak magnitude of the fault current, adjusting the impedance value of the variable impedance unit, and connecting the variable impedance unit into the electrical circuit line. The method may further comprise steps of disconnecting the variable impedance unit from the electrical circuit line when the pre-set value of the peak magnitude of fault current is reached, and generating a turn-off signal for the semiconductor device when the fault current is completely commutated to the parallel semiconductor branch and, therefore, the fault current flowing through the parallel semiconductor branch is interrupted instantly upon receiving the turn-off signal.

BRIEF DESCRIPTION OF THE DRAWINGS

The invention will now be explained more closely by the description of different embodiments of the invention and with reference to the appended figures.

FIGS. 1A-B show two hybrid circuit breakers according to the prior art, each of them including a mechanical switch and a semiconductor device connected in parallel with the mechanical switch;

FIG. 2A schematically shows a hybrid circuit breaker, according to the present invention, wherein the hybrid circuit breaker comprises a breaker according to the prior art as shown in FIG. 1a or 1b and a branch, being grounded at one terminal and connected to an electrical circuit line at another terminal and including a switch and a impedance unit;

FIG. 2B schematically shows an electrical circuit when a short circuit fault occurs;

FIG. 3 schematically shows an embodiment of the invention, wherein the hybrid circuit breaker further includes a measuring unit and the branch further includes a semiconductor switch and a variable impedance unit;

FIGS. 4A-C present current waveforms during opening sequences of the invented hybrid circuit breaker and a conventional hybrid circuit breaker as illustrated in FIG. 1b;

FIG. 6a is a schematic diagram illustrating use of a variable capacitance C as an impedance unit; and FIG. 6b is a schematic diagram illustrating use of a variable inductance L as an impedance unit.

DETAILED DESCRIPTION OF THE INVENTION

Figure 5:
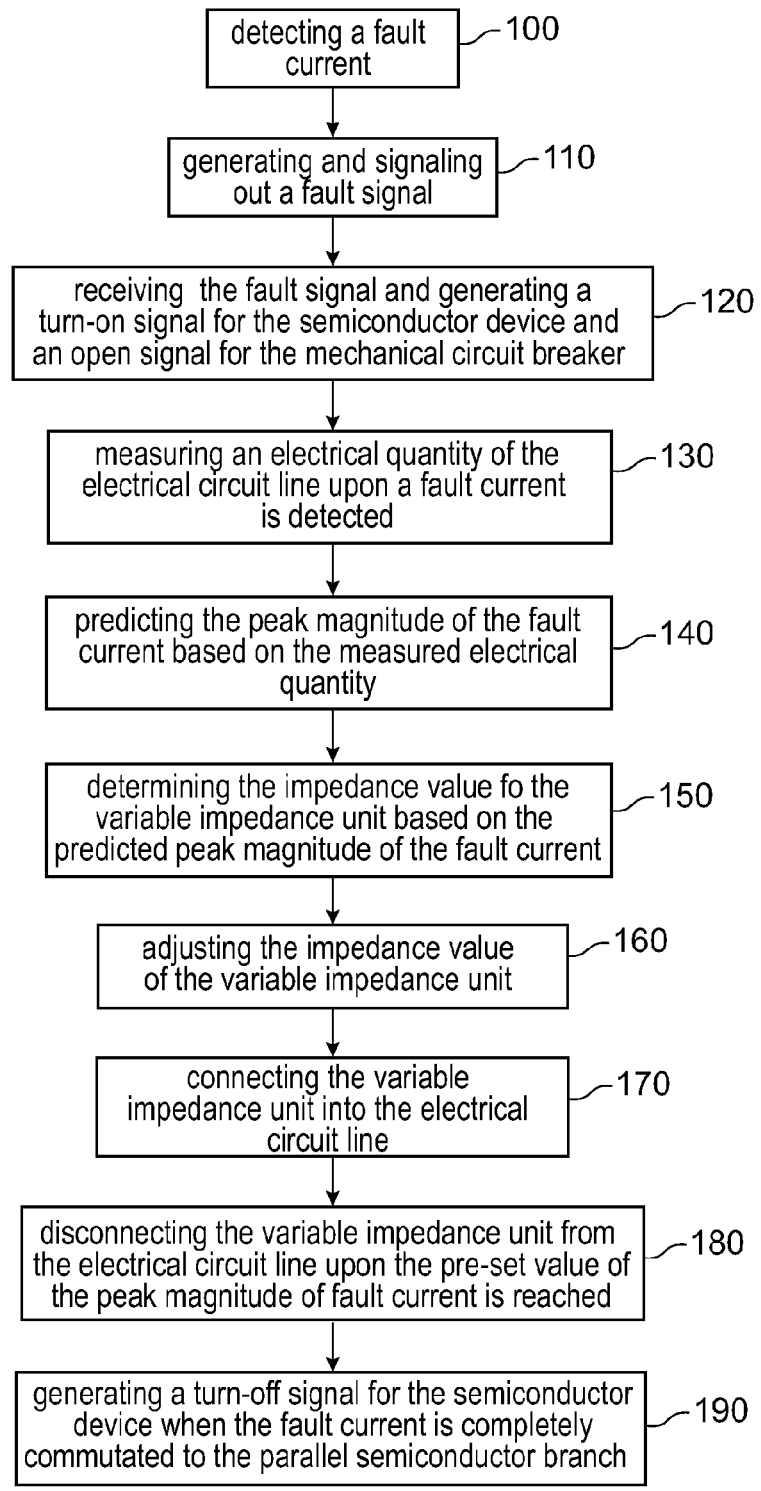
FIG. 5 shows a flow chart of a method to interrupt a fault current, according to an embodiment of the invention.

FIG. 2a schematically shows a hybrid circuit breaker 1 according to the present invention. The hybrid circuit breaker 1 connected in an electrical circuit line comprises a breaker 2 of a type of prior art as shown in FIG. 1a or FIG. 1b, a branch 3 and a control unit 4.

The electrical circuit line comprises at least one power source at one end and has a line impedance Z. In this example, the line comprises a power source S at one end and a power load L at another end. However, it can be two power sources arranged at both ends.

The breaker 2 may further comprise a mechanical circuit breaker and a solid-state part including a semiconductor switch. It should be understood that a fault detecting unit may be arranged for detecting an increase of current due to a fault and a controller may be arranged for controlling the operation of the mechanical circuit breaker and the semiconductor switch upon detecting a fault current. As illustrated in FIG. 1b, the breaker 2 comprises the mechanical circuit breaker $S_{mech}$ connected in series with the line for carrying current in a normal working condition and interrupting the line upon detecting a fault current and a semiconductor device connected in parallel with the mechanical breaker $S_{mech}$. The semiconductor device further includes two circuitry sections 40, 50 connected in parallel with each other. The first section 40 comprises two thyristors $G_1$ and $G_2$, for example of type IGBT or GTO. The thyristors $G_1$ and $G_2$ are connected in anti-parallel and arranged for conducting the fault current when the mechanical breaker is open. The second section 50 comprises a varistor V for absorbing energy stored in the inductance loop.

The branch 3 is grounded at one terminal and connected to the line by another terminal at the same location as the breaker 2 and includes an impedance unit 5 having an impedance value $Z_3$.

In a normal working condition, the mechanical breaker 20 is in a closed position and the impedance unit 5 of the branch 3 is disconnected from the line. The current flows through the mechanical breaker between the power source and the power load.

When a fault occurs in the line, the current increases suddenly and the voltage decreases instantaneously. The fault detecting means detects the fault and signals out the fault to the controller and control unit 4. Upon receiving the fault signal, the control unit 4 connects the impedance unit to the line.

To explain the principle of the invention, an equivalent circuit scheme of FIG. 2a, when a short circuit fault occurs, is schematically shown in FIG. 2b.

Let us assume that the impedance between the source S and the hybrid circuit breaker 1 is $Z_1$ and between the fault location and the hybrid circuit breaker 1 is $Z_2$. The total line impedance Z in a normal working condition is $Z_1+Z_2$. When a short circuit current is detected, the impedance unit 5 is connected to the line to form a parallel circuit line with the short circuit. The total impedance Z' can therefore be calculated by $$Z' = Z_1 + \frac{Z_2 \times Z_3}{Z_2 + Z_3} < Z_1 + Z_2$$

This means that the total line impedance is reduced by momentarily imposing an impedance into the line impedance. This consequently makes the magnitude of the fault current flowing in the line increase momentarily, which makes it possible for the mechanical switch to reach much earlier a stable position where the movable contact of the mechanical breaker can be sufficiently locked. This is particularly crucial for a mechanical breaker that reacts when the magnitude of the fault current increases above a pre-set value.

It should be understood that the function of the control unit may be integrated into the controller or implemented as a separate control unit.

In accordance with a preferred embodiment of the invention, the hybrid circuit breaker 1 further includes, as illustrated in FIG. 3, a measuring unit 10 for measuring electrical quantities of the line, for example impedance or current. The measuring unit 10 is connected to the line and may be arranged before or after the hybrid circuit breaker 1. In this example, the measuring unit is placed after the breaker 1. An example of such a measuring unit may be a sensing unit. The branch 3 further includes a semiconductor unit connected in series with the impedance unit 5. In this example, a semiconductor switch $G_3$ is connected to a variable resistance unit R that has an adjustable resistance value. However, a variable inductance or a variable capacitance can be also used as an impedance unit. Examples of the use of a variable capacitance C and variable inductance L are illustrated in FIGS. 6a and 6b. The semiconductor switch $G_3$ is adapted to connect or disconnect the variable resistance unit R upon receiving a control signal from the control unit 4.

The control unit 4 is further configured, upon receiving a fault current signal, to predict the peak magnitude of the fault current based on the measured electrical quantities. In case that impedance is measured, the peak magnitude of the fault current can be predicted by the peak magnitude of voltage and the measured impedance. Based on the predicted peak magnitude of the fault current, the control unit is further adapted to determine the impedance value of the variable resistance unit R such that the magnitude of the fault current increases to a pre-set value in a fixed time. When a suitable value is determined, the value of the variable resistance R is adjusted accordingly. Thereafter, the control unit sends a turn-on signal to the semiconductor switch $G_3$ to connect the resistance unit R into the line. With an adjusted impedance value, a breaking operation can be finished during a fixed time duration regardless of the fault location that may affect the impedance between the power source and the fault location.

Once the magnitude of the fault current increases to the pre-set value, the mechanical switch starts to open and the contacts of the mechanical switch can be locked sufficiently. As a result, an arc is generated between the contacts and an arc voltage is induced in the circuit. The arc voltage acts as a counter-electromotive force. The fault current flowing into the mechanical circuit breaker is reduced and commutated to the parallel semiconductor branch. In parallel with this, the control unit 4 sends a turn-off signal to the semiconductor switch $G_3$ to disconnect the resistance unit R from the line. It is advantageous that the semiconductor switch has a turn-off capability so that the impedance unit can be disconnected from the line at a desirable time. In this example, an IGBT is provided. However, another high-power semiconductor device is also applicable, for example a GTO. In case a GTO is used, the control unit may further be configured to shape turn-on or turn-off currents to prevent device destruction. When the variable resistance R is disconnected from the line, the line current decreases to a natural level and enables a shorter commutation time. When the fault current is completely commutated to the parallel semiconductor device, the semiconductor device $G_1$, $G_2$ interrupts the fault current instantly upon receiving a turn-off signal. Energy remaining in the circuit line is absorbed by a parallel-connected solid-state device, for example an arrester or a varistor, to suppress over-voltages in the circuit. Due to a lower peak current, the temperature rise in the semiconductor device is lower, which results in a lower energy being stored in the loop inductance. This results in a reduced rate of a solid-state device for absorbing energy, makes the hybrid circuit breaker more compact and reduces the production cost of such a hybrid circuit breaker.

FIG. 5 shows a flow chart of a method to interrupt a fault current, according to an embodiment of the invention.

Current waveforms in different parts during opening sequences of the invented hybrid circuit breaker and a conventional hybrid circuit breaker shown in FIG. 1b are comparably presented in FIG. 4a-c, wherein curves in solid line denote current waveforms of different parts of an invented hybrid circuit breaker shown in FIG. 3 while curves in dotted line denote current waveforms of different parts of a conventional hybrid breaker. As illustrated in FIG. 4a, it takes a time $T_d$ to detect and signal out an occurrence of a fault current after a fault occurs, steps 100 and 110 in FIG. 5. Upon receiving the fault signal, a turn-on signal for the semiconductor device and an open signal for the mechanical circuit breaker are generated, step 120. The peak value $i_p$ of the fault current magnitude is predicted based on the measured impedance, steps 130 and 140. Thereafter, the impedance value $Z_3$ of the impedance unit 5 is adjusted and the semiconductor switch $G_3$ is turned on to connect the impedance unit R to the line, steps 150, 160 and 170. This makes the fault current momentarily rise to a pre-set value in order to make the contacts of the mechanical breaker locked sufficiently. This momentarily increased current therefore makes the mechanical breaker react faster due to the fact that, during a shorter time $T_1$, the magnitude of the fault current reaches the pre-set value earlier. Once the magnitude of the fault current rises to the pre-set value, the semiconductor switch $G_3$ is turned off so that the impedance unit 5 is disconnected from the line, step 180, which makes the fault current drop back to a natural value and results in an earlier commutation from the mechanical breaker to the semiconductor device, a shorter commutation duration $T_{c1}$, a lower turn-off current and a lower energy $E_1$ needed to be absorbed by varistor V, as can be observed in FIG. 4b and FIG. 4c. Once the fault current is completely commutated to the parallel semiconductor branch, a turn-off signal for the semiconductor device is generated to interrupt the fault current flowing through the parallel semiconductor branch, step 190.

What is claimed is:

1. A hybrid circuit breaker for interrupting a fault current in an electrical circuit line having a line impedance, the hybrid circuit breaker comprising
   a mechanical circuit breaker adapted to interrupt the line upon detecting the fault current, and
   a semiconductor device arranged in parallel with the mechanical circuit breaker to conduct the fault current when the mechanical circuit breaker is disconnected,
   characterized in that
   the hybrid circuit breaker further comprises a branch connected between the electrical circuit line and ground, the branch including a variable impedance unit, and
   a control unit configured, upon detecting the fault current, to adjust the impedance value of the variable impedance unit, and
   to connect the variable impedance unit in parallel with the line impedance
   wherein the control unit is further configured, upon detecting the fault current, to determine an impedance value of the variable impedance unit so that the magnitude of the fault current increases to a pre-set value in a fixed time and to adjust the impedance value of the variable impedance unit to the determined impedance value.

2. The hybrid circuit breaker according to claim 1, wherein the hybrid circuit breaker further comprises a measuring unit to measure an electrical quantity of the electrical circuit line and the control unit is further configured, upon detecting the fault current, to predict the peak magnitude of the fault current based on the measured electrical quantity of the electrical circuit line and to determine the impedance value of the variable impedance unit based on the predicted peak magnitude of the fault current.

3. The hybrid circuit breaker according to claim 2, wherein the measured electrical quantity is any of current or impedance.

4. The hybrid circuit breaker according to claim 1, wherein the control unit is further configured to disconnect the variable impedance unit from the line impedance when the pre-set value of the peak magnitude of the fault current is reached.

5. The hybrid circuit breaker according to claim 1, wherein the variable impedance unit is any of variable resistance, variable inductance or variable capacitance, or a combination thereof.

6. The hybrid circuit breaker according to claim 1, wherein the branch further comprises a switch adapted, upon receiving a control signal from the control unit, to connect or disconnect the variable impedance unit to the line impedance.

7. The hybrid circuit breaker according to claim 6, wherein the switch is a semiconductor unit with turn-off capability.

8. A method for interrupting a fault current in an electrical circuit line having a line impedance, wherein a hybrid circuit breaker is connected in the electrical circuit line including a mechanical circuit breaker, a semiconductor device arranged in parallel with the mechanical circuit breaker and a branching including a variable impedance unit, the method comprising steps of
   detecting a fault current,
   generating and signaling out a fault signal,
   receiving the fault signal and generating a turn-on signal for the semiconductor device and an open signal for the mechanical circuit breaker,
   measuring an electrical quantity of the electrical circuit line when a fault current is detected,
   predicting the peak magnitude of the fault current based on the measured electrical quantity,
   determining the impedance value of the variable impedance unit based on the predicted peak magnitude of the fault current,
   adjusting the impedance value of the variable impedance unit, and
   connecting the variable impedance unit into the electrical circuit line.

9. The method according to claim 8, wherein the method further comprises the steps of
   disconnecting the variable impedance unit from the electrical circuit line when the pre-set value of the peak magnitude of fault current is reached, and
   generating a turn-off signal for the semiconductor device when the fault current is completely commutated to the parallel semiconductor branch.

* * * * *